(12) United States Patent
Raghavan et al.

(10) Patent No.: US 11,134,473 B2
(45) Date of Patent: Sep. 28, 2021

(54) ANTENNA ELEMENT SET SELECTION SYSTEM

(71) Applicant: QUALCOMM Incorporated, San Diego, CA (US)

(72) Inventors: Vasanthan Raghavan, West Windsor Township, NJ (US); Joseph Patrick Burke, San Diego, CA (US); Juergen Cezanne, Ocean Township, NJ (US); Ozge Koymen, Princeton, NJ (US); Junyi Li, Chester, NJ (US)

(73) Assignee: QUALCOMM Incorporated, San Diego, CA (US)

(*) Notice: Subject to any disclaimer, the term of this patent is extended or adjusted under 35 U.S.C. 154(b) by 30 days.

(21) Appl. No.: 16/554,049

(22) Filed: Aug. 28, 2019

(65) Prior Publication Data

US 2021/0068077 A1 Mar. 4, 2021

(51) Int. Cl.
*H04B 7/06* (2006.01)
*H04W 72/02* (2009.01)
(Continued)

(52) U.S. Cl.
CPC .......... *H04W 72/02* (2013.01); *H04L 5/0032* (2013.01); *H04L 5/0053* (2013.01);
(Continued)

(58) Field of Classification Search
None
See application file for complete search history.

(56) References Cited

U.S. PATENT DOCUMENTS 9,867,139 B1* 1/2018 Khasgiwala ........ H04W 52/367
2011/0026418 A1* 2/2011 Bollea .................. H01Q 3/2605
370/252

(Continued)

OTHER PUBLICATIONS

China Telecom: "Enhancements on Multi-Beam Operation for UL Beam Management", 3GPP Draft, 3GPP TSG RAN WG1 Ad-Hoc Meeting 1901, R1-1900637, 3rd Generation Partnership Project (3GPP), Mobile Competence Centre, 650, Route Des Lucioles, F-06921 Sophia-Antipolis Cedex, France, vol. RAN WG1. No. Taipei, Jan. 21, 2019-Jan. 25, 2019 Jan. 20, 2019 (Jan. 20, 2019), XP051593484, pp. 1-4, Retrieved from the Internet: URL:http://www.3gpp.org/ftp/Meetings%5F3GPP%5FSYNC/RAN1/Docs/R1%2D1900637%2Ezip [retrieved on Jan. 20, 2019] Section 2.
(Continued)

*Primary Examiner* — Sithu Ko
(74) *Attorney, Agent, or Firm* — QUALCOMM Incorporated

(57) ABSTRACT

This disclosure generally relates to systems, devices, apparatuses, products, and methods for wireless communication. For example, a user equipment (UE) device within a wireless communication system determines one or more performance metrics associated with an operation of the UE. The UE selects, based at least in part on the one or more performance metrics, one or more sets of antenna elements from a plurality of sets of antenna elements available for an inter-band carrier aggregation communication across at least two radio frequency (RF) chains between the UE and one or more base stations. The UE sends an indication of the one or more selected sets of antenna elements from the UE to the one or more base stations.

28 Claims, 11 Drawing Sheets

(51) Int. Cl.
*H04L 5/00* (2006.01)
*H04W 72/04* (2009.01)
*H04W 72/10* (2009.01)

(52) U.S. Cl.
CPC ..... *H04W 72/046* (2013.01); *H04W 72/0413* (2013.01); *H04W 72/0453* (2013.01); *H04W 72/10* (2013.01)

(56) References Cited

U.S. PATENT DOCUMENTS

| | | |
|---|---|---|
| 2011/0249576 A1* | 10/2011 | Chrisikos ................ H01Q 9/14 370/252 |
| 2013/0005278 A1* | 1/2013 | Black .................... H01Q 1/241 455/77 |
| 2013/0244656 A1* | 9/2013 | Heo ........................ H04L 1/189 455/436 |
| 2015/0010099 A1 | 1/2015 | Lin et al. |
| 2015/0085944 A1* | 3/2015 | Mobasher ............ H04B 7/0413 375/267 |
| 2016/0344456 A1* | 11/2016 | Prendergast ......... H04B 7/0417 |
| 2016/0365879 A1* | 12/2016 | Soliman ............... H04B 1/0053 |
| 2017/0303265 A1* | 10/2017 | Islam ................... H04B 7/0417 |
| 2018/0006703 A1* | 1/2018 | Kim .................. H04L 25/03898 |
| 2018/0278320 A1 | 9/2018 | Chendamarai et al. |
| 2019/0372630 A1* | 12/2019 | Brunel ................. H04B 7/0617 |

OTHER PUBLICATIONS

International Search Report and Written Opinion—PCT/US2020/047986—ISA/EPO—dated Nov. 23, 2020.

\* cited by examiner

ANTENNA ELEMENT SET SELECTION SYSTEM

TECHNICAL FIELD

This disclosure relates generally to wireless communications, and more specifically, to antenna element set selection techniques.

DESCRIPTION OF RELATED TECHNOLOGY

Wireless communications systems are widely deployed to provide various types of communication content such as voice, video, packet data, messaging, broadcast, and other types of content. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes that may simultaneously support communication for multiple communication devices (e.g., user equipment (UE)).

Some wireless networks may utilize higher frequencies and smaller wavelengths to provide higher data rates. As one example, fifth generation (5G) capable millimeter wave (mmW) devices may communicate using frequencies at or near the extremely high frequency (EHF) spectrum with wavelengths at or near millimeter wavelengths. Although higher-frequency signals provide larger bandwidths to efficiently communicate large amounts of data, these signals may suffer from higher path loss (e.g., path attenuation). To compensate for the higher path loss, transmit power levels may be increased or beamforming may be used to concentrate energy in a particular direction.

In some cases, a wireless device (e.g., a UE) may be configured with multiple antenna elements, which may be organized into multiple antenna panels or arrays. A UE may use the multiple antenna elements for beamformed communication with another device (e.g., using mmW communication techniques). For example, the UE may use one or more of its antenna elements to receive beamformed signals transmitted from a base station to the UE. Additionally, the UE may use one or more of its antenna elements to transmit beamformed signals from the UE to a base station. When multiple different antenna elements or different combinations of antenna elements are available for use in a given communication situation, an issue may arise regarding which antenna elements or combinations of antenna elements the UE should select for the communication.

SUMMARY

The systems, methods and devices of this disclosure each have several innovative aspects, no single one of which is solely responsible for the desirable attributes disclosed herein. This disclosure generally relates to systems, devices, apparatuses, products, and methods for wireless communication.

As one example, the disclosure relates to systems, devices, apparatuses, products, and methods regarding a user equipment (UE) that determines one or more performance metrics associated with an operation of the UE. The UE selects, based at least in part on the one or more performance metrics, one or more sets of antenna elements (a set of antenna elements may also be known as a subarray) from a plurality of sets of antenna elements available for an inter-band carrier aggregation communication across at least two radio frequency (RF) chains between the UE and one or more base stations. The UE sends an indication of the one or more selected sets of antenna elements from the UE to the one or more base stations.

As another example, the disclosure relates to systems, devices, apparatuses, products, and methods regarding a base station that receives an indication from a UE of one or more sets of antenna elements of the UE selected by the UE for an inter-band carrier aggregation communication between the UE and one or more base stations. The base station selects at least a first base station beam based on the indication of the one or more sets of antenna elements selected by the UE. The base station performs at least a part of the inter-band carrier aggregation communication between the UE and the base station using at least the first base station beam.

BRIEF DESCRIPTION OF THE DRAWINGS

The system may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Figure 1:
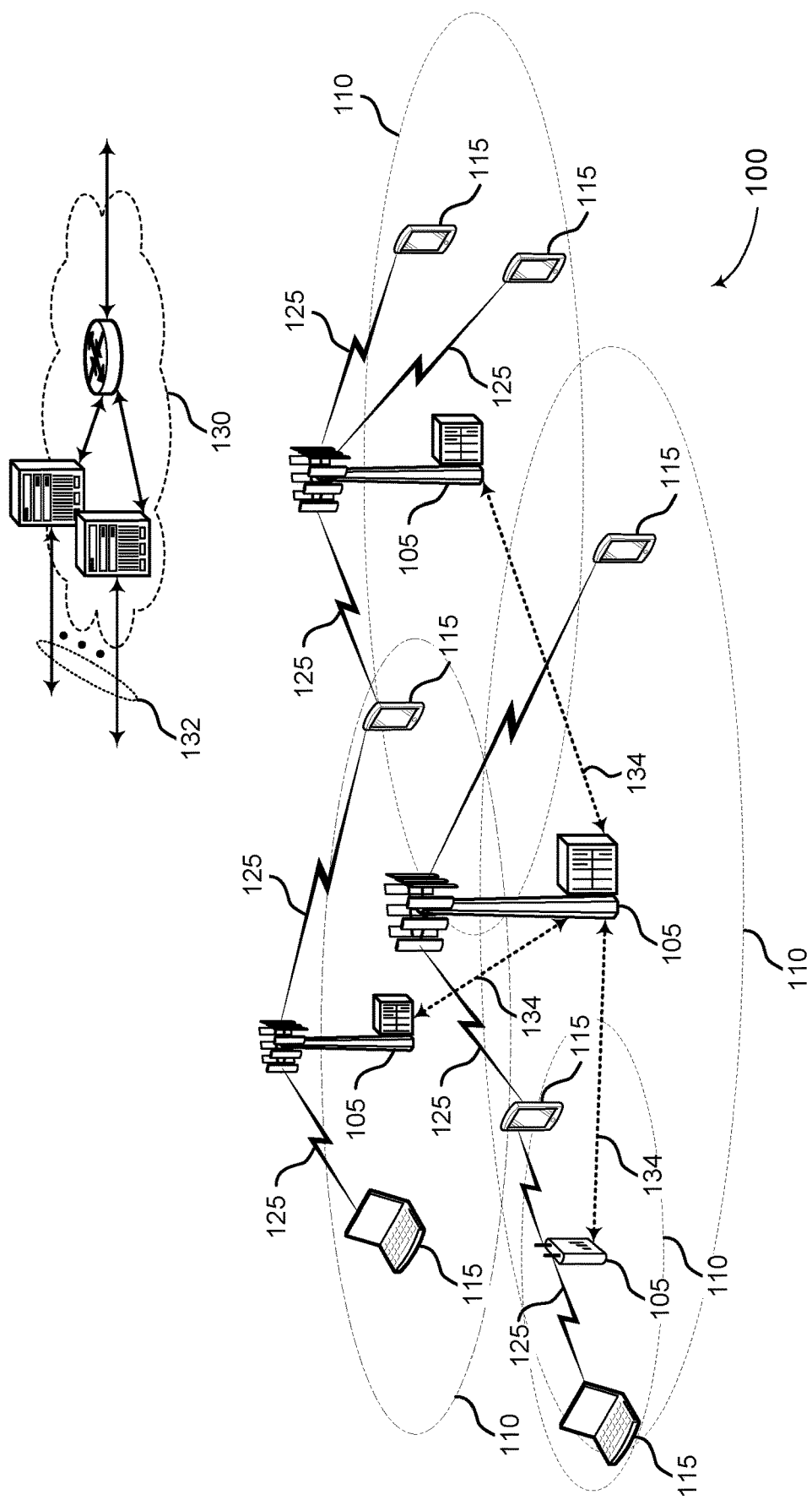
FIG. 1 illustrates an example of a wireless communications system that supports antenna element set selection techniques in accordance with aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

The systems and techniques described in this detailed description provide various mechanisms for selecting one or more sets of antenna elements for an inter-band carrier aggregation communication between a first wireless communication device (e.g., a UE) and one or more second wireless communication devices (e.g., one or more base stations). A carrier aggregation communication split across multiple base stations may also be implemented as a dual connectivity communication.

At the UE side, carrier aggregation implementations may utilize different numbers of RF chains across a single carrier or multiple carriers. Some UE carrier aggregation implementations may be limited to at most two radio frequency (RF) chains (e.g., 2Rx/2Tx), but on a single carrier at a time (e.g., only within a 28 GHz band, only within a 39 GHz band, or only within any single defined frequency band for 5G New Radio). Other UE carrier aggregation implementations may support more than two RF chains. For example, some UE implementations may use up to four, eight, or more RF chains (e.g., 4Rx/2Tx, 4Rx/4Tx, 8Rx/2Tx, 8Rx/4Tx, 8Rx/8Tx, 16Rx/4Tx, 16Rx/8Tx, 16Rx/16Tx, etc.). These RF chains may be used for communication using different beams, carriers, and/or antenna modules.

With advancements in RF chain capabilities, communication systems may support both intra-band carrier aggregation and inter-band carrier aggregation. Intra-band carrier aggregation uses two or more component carriers from within one defined frequency band. For example, when considering mmWave communications, an intra-band carrier aggregation communication may use two or more component carriers from within only one of the 24 GHz band, 26 GHz band, 28 GHz band, 39 GHz band, 42 GHz band, 60 GHz band, 73 GHz band, or any other defined band. Inter-band carrier aggregation uses two or more component carriers where at least one component carrier is from within one defined frequency band and at least one component carrier is from a different defined frequency band. For example, when considering mmWave communications, an inter-band carrier aggregation communication may use one or more component carriers from within a first one of the 24 GHz, 26 GHz, 28 GHz, 39 GHz, 42 GHz, 60 GHz, or 73 GHz bands (or any other defined band), and one or more component carriers from within a different one of the 24 GHz, 26 GHz, 28 GHz, 39 GHz, 42 GHz, 60 GHz, or 73 GHz bands (or any other defined band). Inter-band carrier aggregation may also aggregate one or more component carriers from within mmWave bands with one or more component carriers from outside of the mmWave bands (e.g., a sub-6 GHz component carrier, other frequency range 1 (FR1) component carrier, or any non-mmWave component carrier).

As one example, 3GPP RAN4 agreement detailed in R4-1902678 indicates different operating bands and band classes in which bands n257, n258, and n261 may be considered to be 24/28 GHz bands while band n260 may be considered to be a 39 GHz band. Intra-band carrier aggregation may be supported within a certain band class (aggregation of carriers that are within a single band class such as one of n257, n258, n260, or n261). Inter-band carrier aggregation may be supported across multiple band classes (aggregation of carriers that are in different band classes).

A UE may include many different antenna elements organized into one or more antenna modules. Each module may include multiple subarrays of antenna elements. Some antenna modules may include different types of antenna elements, such as wideband antennas (e.g., dipole) or narrowband antennas (e.g., patch). Other antenna types such as slotted antennas, waveguide antennas, monopole antennas, etc. can also be included. Also, some antenna elements may be configured or optimized for communication within a certain band or certain polarization. For example, an antenna module may include a patch antenna customized for operation within a specific band (e.g., 28 GHz or 39 GHz or any other band) at a specific polarization (e.g., horizontal polarization (HPol) or vertical polarization (VPol)). A module may have a dedicated antenna element for each of these combinations of bands and polarizations (e.g., a patch antenna for 28 GHz H-polarization, a patch antenna for 28 GHz V-polarization, a patch antenna for 39 GHz H-polarization, a patch antenna for 39 GHz V-polarization, a dipole antenna for covering 28 and 39 GHz in a certain polarization, etc.). If a UE supports other bands, then the UE may also require additional antenna elements customized for those bands. Thus, as the number of supported bands increases in a UE, the number of antenna elements in a UE also increases.

With an increase in the number of bands supported by a UE and/or an increase in the number of allowable RF chains at the UE, the number of different combinations of antenna elements that could be used at the UE to support all the possible bands and RF chain combinations also increases significantly, especially when considering an inter-band carrier aggregation communication. The complexity of managing a large number of possible band and RF chain combinations is high. As one example, at a certain point, the number of supported bands and allowable RF chains may become too high for a UE to check all possible combinations of antenna elements using an exhaustive search approach during the amount of time available to make antenna element selections during some operating conditions (e.g., mobility, channel coherence, latency for application, etc.). Thus, the techniques disclosed herein propose various approaches for improved antenna element set or subarray selection in carrier aggregation systems.

FIG. 1 illustrates an example of a wireless communications system 100 that supports techniques for selecting one or more sets of antenna elements based on performance metrics for an inter-band carrier aggregation communication between a first wireless communication device (e.g., a UE) and one or more second wireless communication devices (e.g., one or more base stations). The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, a fifth generation (5G) New Radio (NR) network, or another type of network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the device may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some systems, millimeter wave (mmW) communications may occur in a frequency range (also known as frequency range 2 "FR2") that exists at or above 24 GHz (which may include portions of the total frequency range that are within the millimeter band as well as near the millimeter band). In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antenna elements or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmWave receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antenna elements of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In the wireless communications system 100, one or more of the UEs 115 may be configured to dynamically select one or more sets of antenna elements to possibly use for a planned inter-band carrier aggregation communication (e.g., a multi-band communication with one or multiple base stations 105). The UE's selection may be based on one or more performance metrics regarding an operation of the UE. After selecting the one or more preferred sets of antenna elements, the UE notifies the base station of the selection. Further details of the antenna element set selection algorithms are described in more detail below.

Figure 2:
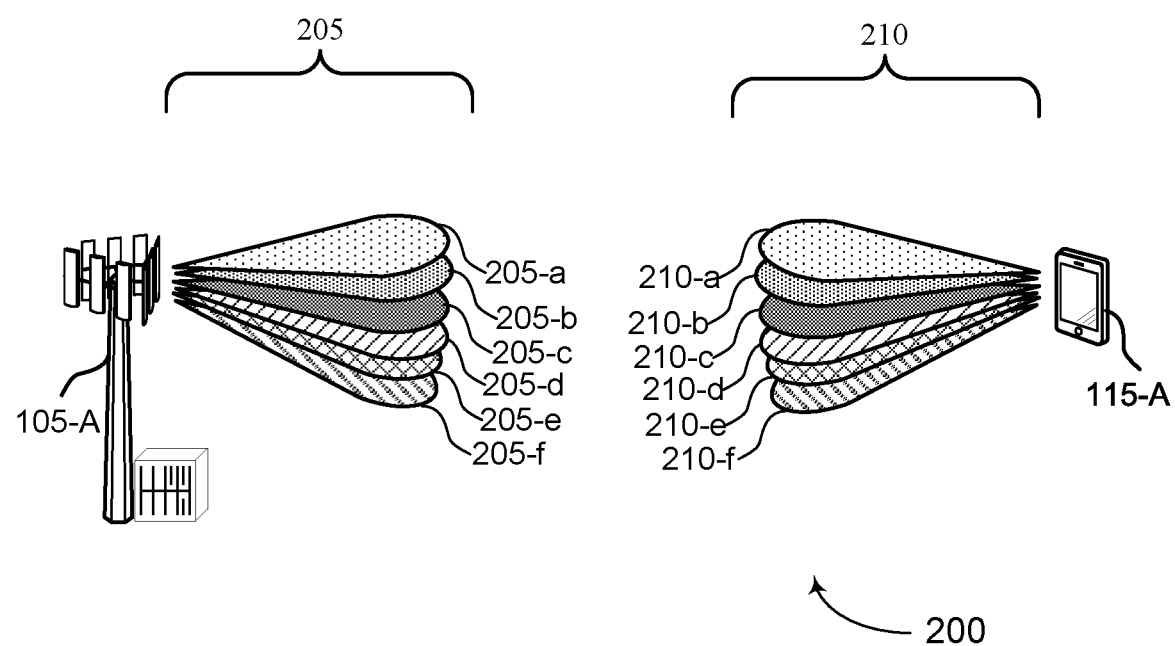
FIG. 2 illustrates an example of a portion of a wireless communications system that uses beamformed transmissions and that supports antenna element set selection techniques.

FIG. 2 illustrates an example of a portion of a wireless communications system 200 that uses beamformed transmissions and that supports antenna element set selection based on performance metrics for an inter-band carrier aggregation communication. In some examples, wireless communications system 200 may implement aspects of wireless communications system 100. In the example of FIG. 2, wireless communications system 200 may include base station 105-a and UE 115-a, which may be examples of the corresponding devices described with respect to FIG. 1. In this example, UE 115-a and base station 105-a may use beamformed communications to establish a connection via one or more beams 205 at the base station and one or more beams 210 at the UE.

In some cases, base station 105-a and UE 115-a may establish communication via a beam pair link using a base station beam 205 and a UE beam 210 that are determined based on a beam training procedure (e.g., a P1 initial beam training procedure, a P2/P3 beam refinement procedure, etc.) in which the UE 115-a and base station 105-a may measure one or more parameters of beams transmitted in a beam sweep sequence. Such measurements may be used to determine a particular pair of beams that are to be used for communications. In some cases, one or more reference signals may be measured to determine one or more beams that are to be used for communications. For example, the base station 105-a may transmit a reference signal (e.g., one or more synchronization signals in one or more synchronization signal blocks (SSBs), channel state information reference signals (CSI-RSs), or combinations thereof) on a series of beams 205 that may be measured at the UE 115-a to provide a measurement report that is used to select a preferred base station beam 205, preferred UE beam 210, or both (e.g., based on beam reciprocity assumptions).

In some cases, the UE 115-A and the base station 105-A may communicate regarding one or more preferred antenna element sets. For example, the UE 115-A may send an indication to a base station of one or more preferred UE antenna element sets for use during an inter-band carrier aggregation communication. The base station 105-A may then use this indication to focus its beam selection or beam training process on the beams that are most likely to be relevant to the selected set of UE antenna elements. Further details regarding the use of preferred antenna element set indications on the beam training and selection processes will be described in more detail below.

Figure 3:
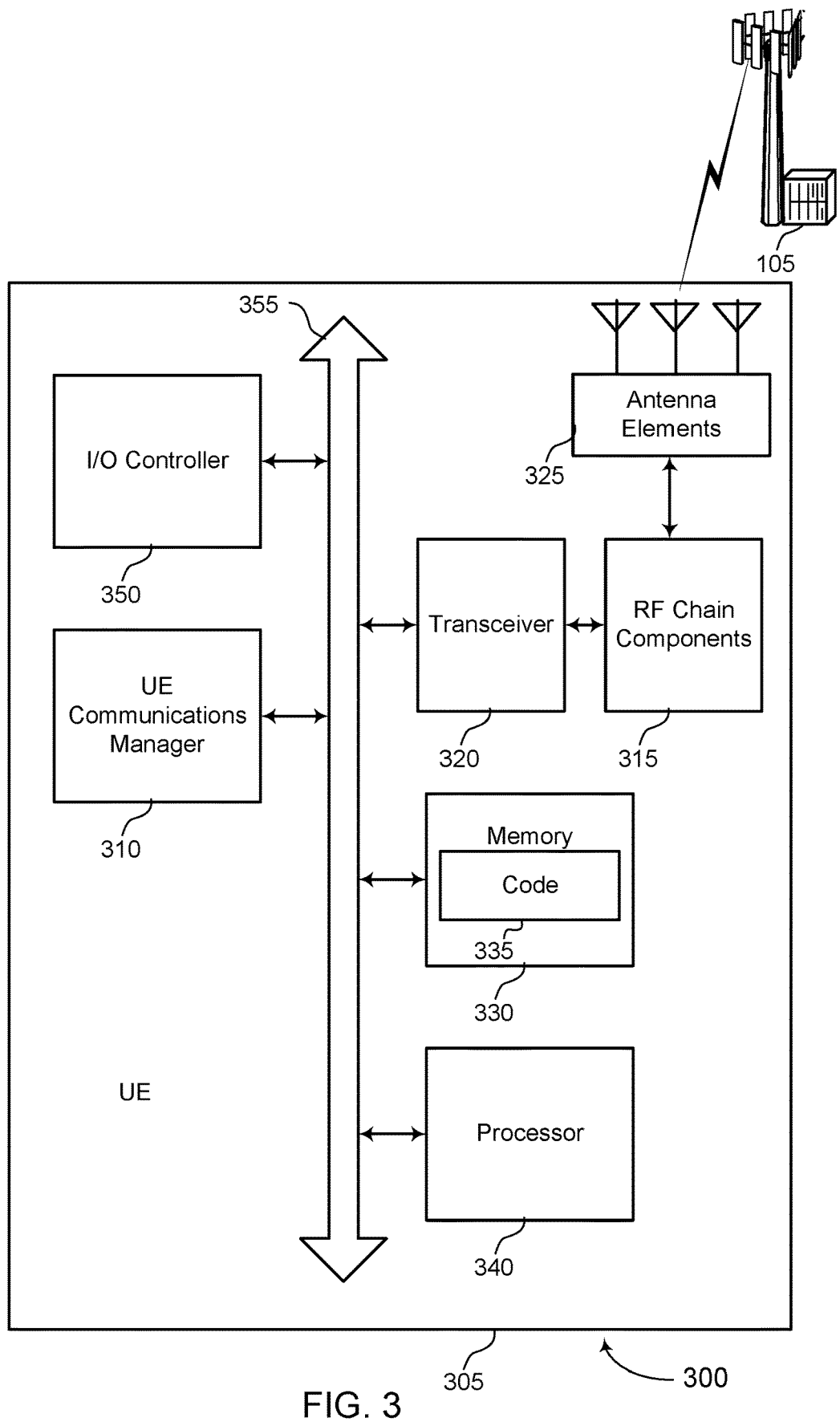
FIG. 3 is a diagram of a wireless communication device (e.g., a UE) configured to support antenna element set selection techniques.

FIG. 3 is a diagram of a system 300 including a device 305 that is configured to select one or more sets of antenna elements based on performance metrics for an inter-band carrier aggregation communication. The device 305 may be an example of a UE 115 as described in connection with FIGS. 1 and 2. The device 305 may include components for bi-directional voice and data communications including components for transmitting and receiving communications, including one or more communications managers 310, one or more RF chain components 315, one or more transceivers 320, one or more antenna elements 325, one or more memory devices 330, one or more processors 340, and one or more I/O controllers 350. These components may be in electronic communication via one or more buses (e.g., bus 355).

The communications manager 310 may manage the process of generating signals, transmitting signals, receiving signals, and processing the received signals. The communications manager 310 may work in connection with other components of device 305 (e.g., the processor 340, the transceiver 320, the antenna elements 325, and other RF chain elements) to perform the various communication functions described herein. When operating as part of an antenna element set selection system at device 305, the communications manager 310 may manage the process of selecting one or more sets of desired antenna elements based on performance metrics (e.g., as described below in connection with FIGS. 6-12). The communications manager 310 may comprise its own processor or may be a functional component of processor 340.

Transceiver 320 may communicate bi-directionally, via one or more antenna elements (e.g., antenna elements 325). For example, the transceiver 320 may represent a wireless transceiver and may communicate bi-directionally with another wireless transceiver. The transceiver 320 may also include a modem to modulate the packets and provide the modulated packets to the antenna elements for transmission, and to demodulate packets received from the antenna elements. The transceiver 320 may send the received signals to another component (e.g., the processor 340 or communications manager 310) for further processing.

The device 305 may have multiple antenna elements 325, which may be capable of concurrently transmitting or receiving multiple wireless transmissions. The antenna elements 325 may be organized within one or more antenna arrays or panels. The antenna elements 325 may receive radio waves that correspond to the content of a downlink signal, and pass the received signals to the transceiver 320 for further processing. The antenna elements 325 may also receive uplink signal content from the transceiver 320 and radiate radio waves that correspond to the content of an uplink signal.

The device 305 may include RF chain components 315 that may process signals between the antenna elements 325 and the transceiver 320. For example, the RF chain components 315 may include one or more of: RF integrated circuits (RFICs), amplifiers, filters, converters, oscillators, phase shifters, mixers, attenuators, or detectors. The RF chain components 315 may process outgoing signals sent from the modem/transceiver intended for transmission from the antenna elements. The RF chain components 315 may also process incoming signals received from the antenna elements intended for the modem/transceiver.

The memory 330 of device 305 may include RAM, ROM, or a combination thereof. The memory 330 may store computer-readable code 335 including instructions that, when executed by a processor (e.g., the processor 340 or another processor in the device 305, such as a processor associated with the transceiver 320, modem, or communication manager 310) to cause the device 305 to perform various communication functions described herein. In some cases, the memory 330 may contain, among other things, a BIOS which may control basic hardware or software operation such as the interaction with peripheral components or devices. The memory 330 may also include instructions to cause the device 305 to perform the antenna array set selection features described herein.

The code 335 may include instructions to implement aspects of the present disclosure, including instructions to select sets of antenna elements and otherwise support wireless communications. The code 335 may be stored in a non-transitory computer-readable medium such as system memory or other type of memory. In some cases, the code 335 may not be directly executable by the processor 340 but may cause a device (e.g., when compiled and executed) to perform functions described herein.

The processor 340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 340 may be configured to operate a memory array using a memory controller. In other cases, a memory controller may be integrated into the processor 340. The processor 340 may be configured to execute computer-readable instructions stored in a memory (e.g., the memory 330) to cause the device 305 to perform various functions (e.g., the functions described in connection with FIGS. 6-12).

The I/O controller 350 may manage input and output signals for the device 305. The I/O controller 350 may also manage peripherals not integrated into the device 305. In some cases, the I/O controller 350 may represent a physical connection or port to an external peripheral. In some cases, the I/O controller 350 may utilize an operating system such as iOS®, ANDROID®, MS-DOS®, MS-WINDOWS®, OS/2®, UNIX®, LINUX®, or another known operating system. In other cases, the I/O controller 350 may represent or interact with a modem, a keyboard, a mouse, a touchscreen, or a similar device. In some cases, the I/O controller 350 may be implemented as part of a processor. In some cases, a user may interact with the device 305 via the I/O controller 350 or via hardware components controlled by the I/O controller 350.

The components of device 305 illustrated in FIG. 3 may be combined together into a smaller number of components, or the functions described herein may be split into a greater number of components. As one example, regarding the ability to combine functions, the functions of the I/O controller 350 and/or the functions of the communication manager 310 may be consolidated together with other control and processing functions and performed by the processor 340 (based on instructions stored in memory 330). Thus, the configuration shown in FIG. 3 represents one example configuration and additional structural configurations are intended to be within the scope of the present disclosure.

Figure 4:
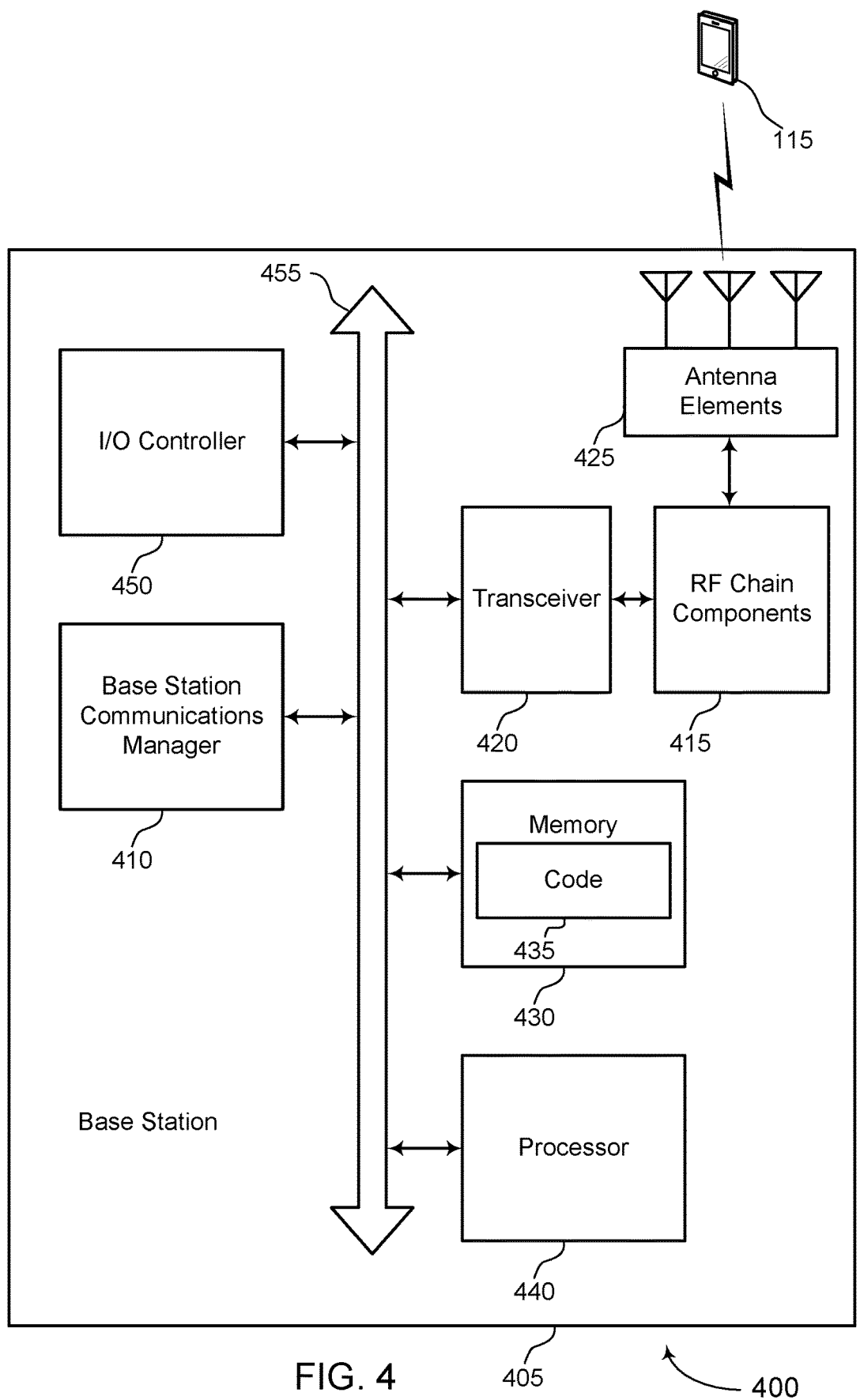
FIG. 4 is a diagram of a wireless communication device (e.g., a base station) configured to support antenna element set selection techniques.

FIG. 4 is a diagram of a system 400 including a device 405 that is configured to receive an indication of a UE selection of one or more sets of antenna elements based on performance metrics for an inter-band carrier aggregation communication. The device 405 may be an example of a base station 105 as described in connection with FIGS. 1 and 2. The device 405 may include components for bi-directional voice and data communications including components for transmitting and receiving communications, including one or more communications managers 410, one or more RF chain components 415, one or more transceivers 420, one or more antennas 425, one or more memory devices 430 (including code 435), one or more processors 440, and one or more I/O controllers 450. These components may be in electronic communication via one or more buses (e.g., bus 455). The components 410, 415, 420, 425, 430, 435, 440, 450, and 455 of device 405 may perform similar functions as the corresponding components 310, 315, 320, 325, 330, 335, 340, 350, and 355 described above in connection with device 305 (FIG. 3). However, the components of device 405 will perform actions from the perspective of the base station instead of the perspective of the UE. For example, when operating as part of an antenna element set selection system at device 405, the components of device 405 may operate to communicate with a UE, coordinate with the UE to select one or more desired antenna element sets, and participate in an inter-band carrier aggregation communication (e.g., as described below in connection with FIGS. 6-12).

Figure 5:
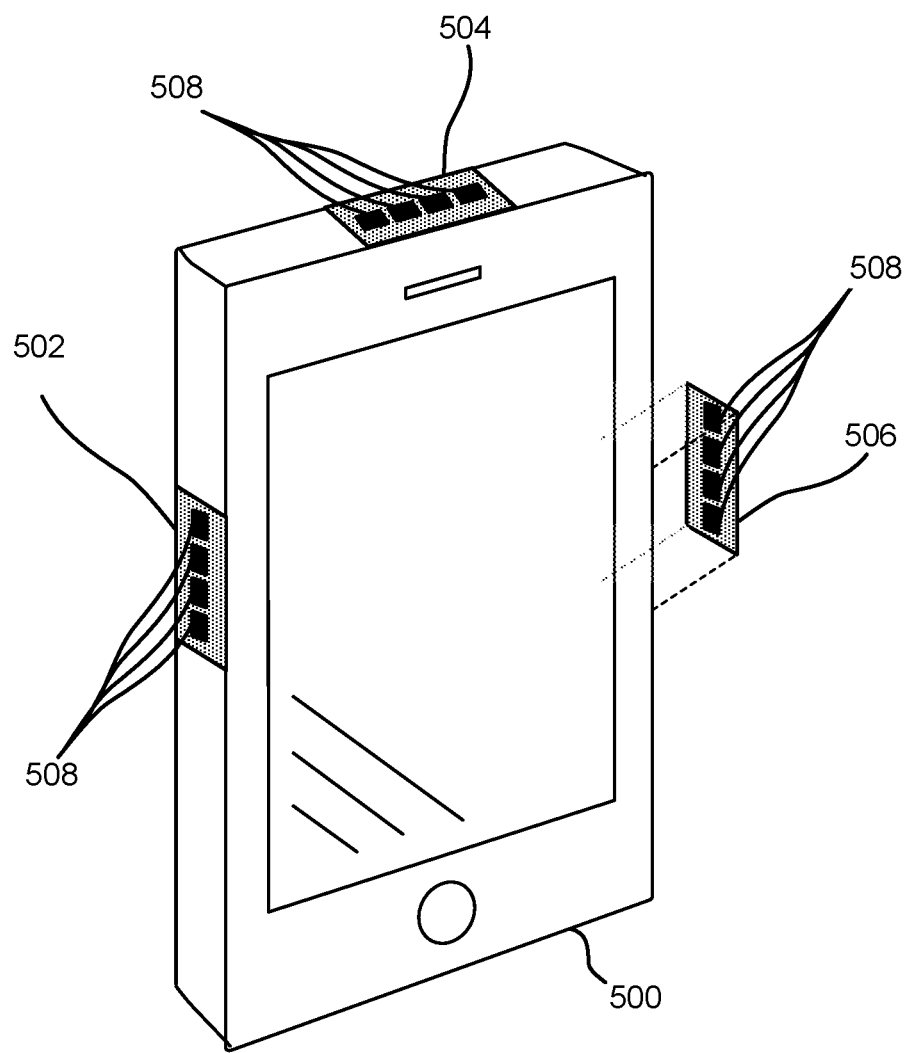
FIG. 5 is a diagram of a wireless communication device with multiple antenna elements spread across multiple antenna modules.

FIG. 5 is a diagram illustrating a UE 500 supporting antenna element set selection for inter-band carrier aggregation, according to one embodiment. The UE 500 may be an example of a UE shown in previous figures, such as UE 115 of FIGS. 1 and 2 or device 305 of FIG. 3. The UE 500 shown in the example of FIG. 5 includes multiple antenna modules, including a first antenna module 502, a second antenna module 504, and a third antenna module 506. Other implementations may include either less antenna modules (e.g., one antenna module or two antenna modules) or more antenna modules (e.g., four or more antenna modules) than the example shown in FIG. 5. The antenna modules 502, 504, and 506 are shown oriented on different edges of the UE 500 in different planar directions to provide modular spatial coverage in different directions for the UE 500.

Each of the antenna modules 502, 504, and 506 may include one or more arrays or subarrays of antenna elements 508. In some implementations, each of the antenna modules 502, 504, and 506 is equipped with antennas across different frequency bands that share one or more RF chains. Example frequency bands include or more of the 24 GHz band, 26 GHz band, 28 GHz band, 39 GHz band, 42 GHz band, 60 GHz band, 73 GHz band, or 85+ GHz band. Other millimeter wave bands, sub-6 GHz bands, or other frequency ranges are also possible to be supported by the antenna elements 508.

In some implementations, the antenna elements 508 may include patch antenna elements, dipole antenna elements, or both. The dipole antenna elements may be wideband and span across one or more frequency bands. Patch antenna elements (or other types of narrowband antennas) may each be designed for operation in one specific frequency band. A UE may have one or more patch antennas designed for each individual frequency band supported by a device. For example, a UE that supports operation in both the 28 GHz and 39 GHz frequency bands may include one or more patch antenna elements optimized for the 28 GHz band and one or more patch antenna elements optimized for the 39 GHz band. As another example, a UE that supports operation in three different frequency bands may include one or more patch antenna elements optimized for the first band, one or more patch antenna elements optimized for the second band, and one or more patch antenna elements optimized for the third band. Additional bands (e.g., over three bands) with corresponding dedicated antenna elements may also be supported in a UE.

The antenna elements 508 may be grouped into subarrays that correspond to either horizontal polarization (HPol) or vertical polarization (VPol). As one example, an antenna subarray (e.g., the antenna elements in one module) that supports 28 GHz and 39 GHz may include the following antenna elements: 1) Patch28 HPol; 2) Patch28 VPol; 3) Patch39 HPol; 4) Patch 39VPol; and 5) dipole (wideband). In other implementations, different configurations of antenna elements may be included in a subarray or module. For example, the device may support additional bands and thus includes additional patch antenna elements customized for the additional bands.

According to one embodiment, each antenna module 502, 504, and 506 may be controlled by an RF integrated circuit (RFIC) and RF chains of the UE may be switched across different antenna modules 502, 504, and 506 to provide for transmission and reception of wireless signals based on a desired beam direction for a base station or cell. Based on the number of available RF chains on the UE 500 and the number of RF chains that may be handled per antenna module, the UE 500 may have different options for selecting sets of antenna elements for supporting inter-band carrier aggregation.

In some implementations, when a UE includes multiple antenna modules and supports multiple RF chains, the UE may include restrictions on the concurrent use of the modules and RF chains. As a first example, a UE may be restricted to a concurrent use of a maximum of two RF chains per module, and a maximum of two RF chains over the entire UE. As a second example, a UE may be restricted to a concurrent use of a maximum of two RF chains per module, and a maximum of four RF chains over the entire UE. As a third example, a UE may be restricted to a concurrent use of a maximum of four RF chains per module, and a maximum of four RF chains over the entire UE. As a general example, a UE may be restricted to a concurrent use of a maximum of "K" RF chains per module, and a maximum of "L" RF chains over the entire UE (e.g., over all antenna modules of the UE), where K is less than or equal to L.

As the number of supported bands increases in a UE, the number of antenna elements in the UE increases. With an increase in the number of bands supported for a UE and/or an increase in the number of allowable RF chains at the UE, the number of different combinations of antenna elements that could be used at the UE to support all the possible band and RF chain combinations also increases significantly, especially when considering an inter-band carrier aggregation communication. Thus, the techniques disclosed herein propose various approaches for improved antenna element set selection in carrier aggregation systems.

Figure 6:
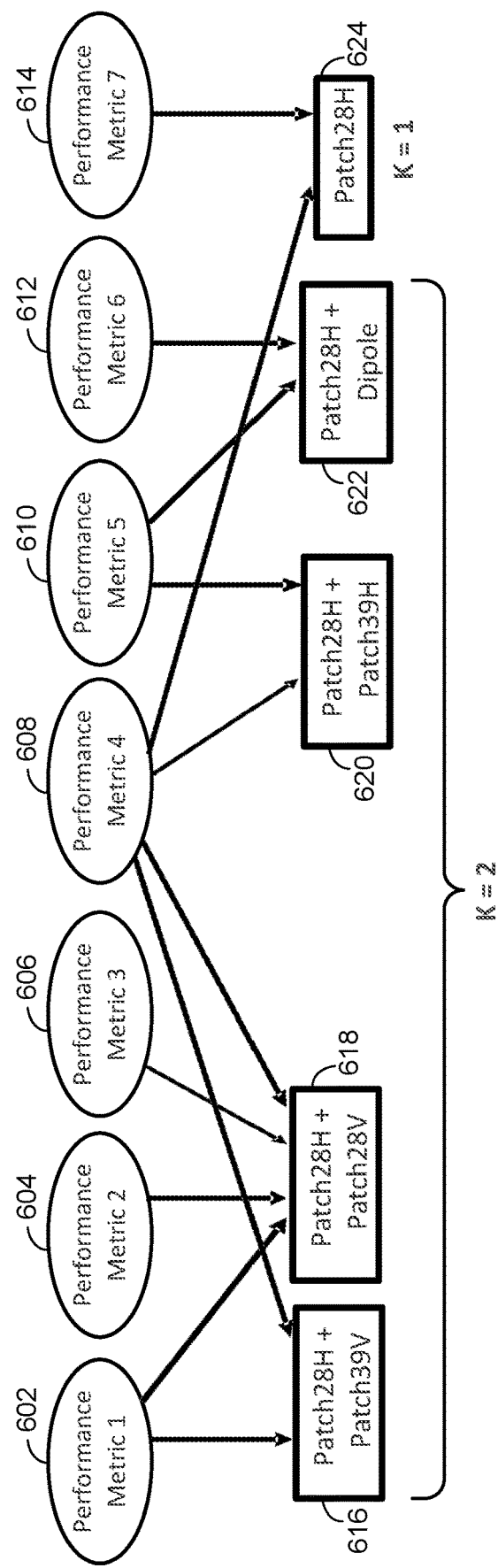
FIG. 6 is a first example of an antenna element set selection procedure based on one or more performance metrics.

FIG. 6 is a first example of a procedure for selecting one or more sets of antenna elements (e.g., selecting between antenna element sets 616, 618, 620, 622, or 624) based on one or more performance metrics (e.g., performance metrics 602, 604, 606, 608, 610, 612, or 614). In other implementations, the system may consider any number of performance metrics (e.g., more or fewer performance metrics than are shown in FIG. 6) and may choose between any number of sets of antenna elements (e.g., more or fewer antenna element sets than are shown in FIG. 6, such as including different combinations of elements or adding antenna elements for additional frequency bands). In the example of FIG. 6, certain performance metrics are associated with certain sets of antenna elements usable together for carrier aggregation communications, such as inter-band carrier aggregation.

The performance metrics 602, 604, 606, 608, 610, 612, and 614 may represent any performance or operational goals/targets for a UE. Performance metric 602 may represent a data rate metric. The data rate metric may be determined by comparing a measured data rate to a target rate threshold. For example, the data rate threshold may check whether a receive or transmit data rate is high enough for the UE's performance goals. Performance metric 604 may represent a power metric. The power metric may be determined by comparing a measured power metric to a power threshold. As one example, the power metric may check a remaining battery capacity against a battery level threshold. As another example, the power metric may check a power usage estimate against a power usage threshold. Performance metric 606 may represent a spectral efficiency metric. The spectral efficiency metric may be determined by comparing a measured spectral efficiency to a spectral efficiency threshold. Performance metric 608 may represent a beam management metric. The beam management metric may consider an amount of overhead associated with a beam management procedure. Performance metric 610 may represent a robustness to polarization loss metric. The robustness to polarization loss metric may consider how robust a transmission/reception would be to losing polarization (e.g., losing an ability to differentiate HPol from VPol in some situations). For example, with multiple bounces of a radio signal over multiple reflectors, clusters or scatterers, a pure HPol or a pure VPol transmission can be received at the receiver only on a certain specific polarization independent of the transmissions. In other words, the transmitted polarization is lost due to multiple bounces in the channel environment. Performance metric 612 may represent a robustness to blockage metric. The robustness to blockage metric may consider how likely a planned transmission/reception beam would be blocked by external obstructions. Such a determination would be dependent on the channel environment in which transmissions/receptions happen (e.g., indoor hotspot, mall, outdoor, suburban settings, downtown, stadium, etc.). Performance metric 614 may represent a thermal metric. The thermal metric may be determined by comparing a measured thermal metric to a target thermal threshold. For example, the thermal metric may check whether a UE's temperature is above or below the threshold.

The antenna element set selection process of FIG. 6 recognizes that some sets of antenna elements may be more favorable than other sets of antenna elements when considering a specific performance goal. For example, some combinations of antenna elements may use more power than other combinations of antenna elements. As another example, some combinations of antenna elements may allow a higher data rate than other combinations of antenna elements. As yet another example, some combinations of antenna elements may be more robust to potential beam blockage than other combinations of antenna elements. As another example, some combinations of antenna elements may result in a higher device temperature than other combinations of antenna elements. Further examples are provided below for various example RF chain configurations.

In an implementation where a UE is limited to two RF chains per antenna module and two total RF chains across all modules of the UE, a UE may select a first type of set of antenna elements, a second type of set of antenna elements, a third type of set of antenna elements, or a fourth type of set of antenna elements. Each type of antenna element set may have unique properties that lead to various benefits or tradeoffs.

The first type of set of antenna elements may include two orthogonal polarizations of patches (HPol and VPol) within the same band/carrier (e.g., Patch28HPol, Patch28VPol). This type of set selection may have a relatively low beam management overhead, allow relatively high rates and spectral efficiency, and lead to a relatively low power consumption. However, this type of set selection may also have an increased thermal gradient/temperature, may have a relatively low robustness to loss of polarization or multiple reflections/bounces, and may have a relatively low robustness to beam blockage.

The second type of set of antenna elements may include one polarization of patch (HPol or VPol) and dipole in same band/carrier (e.g., Patch28HPol, Dipole). This type of set selection may have a relatively high beam based diversity to blockage and polarization loss. However, this type of set selection may also have a relatively higher beam management overhead, may have a higher power consumption, and may result in a higher temperature increase.

The third type of set of antenna elements may include two orthogonal polarizations of patches (HPol and VPol) across two bands/carriers (e.g., Patch28HPol, Patch39VPol). This type of set selection may have a relatively low beam management overhead, and may allow for relatively higher rates. However, this type of set selection may also have reduced spectral efficiency, may lead to slightly increased power consumption, may increase a thermal gradient, and may be relatively low for robustness to beam blockage or loss in polarization.

The fourth type of set of antenna elements may include two patches of a same polarization (HPol or VPol) across multiple bands/carriers (e.g., Patch28HPol, Patch39HPol). This type of set selection may have a relatively low beam management overhead, may provide relatively higher rates, and may be relatively robust to loss of polarization. However, this type of set selection may also have reduced spectral efficiency, may have an increased thermal gradient, may have relatively low robustness to beam blockage, and may lead to slightly increased power consumption.

As described above, the selection of one of the possible types of antenna element sets may have certain benefits and tradeoffs. Thus, the UE may select a preferred set of antenna elements depending on which performance metrics are most important to the UE for a given time period. The relative priorities of the performance metrics may change over time depending on the operating conditions of the UE and the performance expectations determined by one or more applications at the UE. The UE may be programmed with a fixed association table (e.g., stored in memory of the UE) that shows preferred or desirable combinations of antenna elements for specific performance metrics/goals. Thus, the UE may determine a current priority list of performance metrics in order from high importance to low importance. The UE may then use the stored association table and the determined relative priority between metrics to choose the set of antenna elements that will most favorably meet the higher priority performance metrics for the given conditions.

FIG. 6 shows various association mappings between performance metrics 602, 604, 606, 608, 610, 612, and 614 and antenna element sets 616, 618, 620, 622, and 624. For example, if performance metric 602 is most important to the UE at a given time, then the UE may select either antenna element set 616 or antenna element set 618 (or both) for a planned upcoming communication. In the case of multiple suggested antenna element sets for one specific performance metric, the UE may select multiple antenna element sets (in this example, both 616 and 618) for sending to a base station as preferred antenna element sets. Alternatively, the UE may break the tie (e.g., the multiple possible set options) by considering second, third, fourth, or any other number of other performance metrics until a preferred set is determined. For example, if performance metric 604 is the second most important performance metric to the UE at a given time (second to performance metric 602), then the UE may select antenna element set 618 over antenna element set 616 because that antenna element set matches both the first and the second most important performance metrics while antenna element set 616 only matches with one of the metrics.

As another example, at a later time period the operating conditions of the UE may have changed since the last antenna element set selection, and accordingly the most important performance metric may have changed for the UE. For example, for this time period, performance metric 612 may be the highest priority metric (e.g., above the previous metric that had the highest priority: metric 602). Based on this change in performance metric priority over time, the UE may select antenna element set 622 as a preferred antenna element set for this time period based on its association with performance metric 612. The UE may continually or periodically reorder the relative priorities of the performance metrics over time depending on the goals of the UE and the current operating conditions (e.g., the current conditions may be monitored by one or more sensors of the UE and other processing components of the UE). Thus, the preferred antenna element sets may change over time along with the changing relative priorities between performance metrics.

Figure 7:
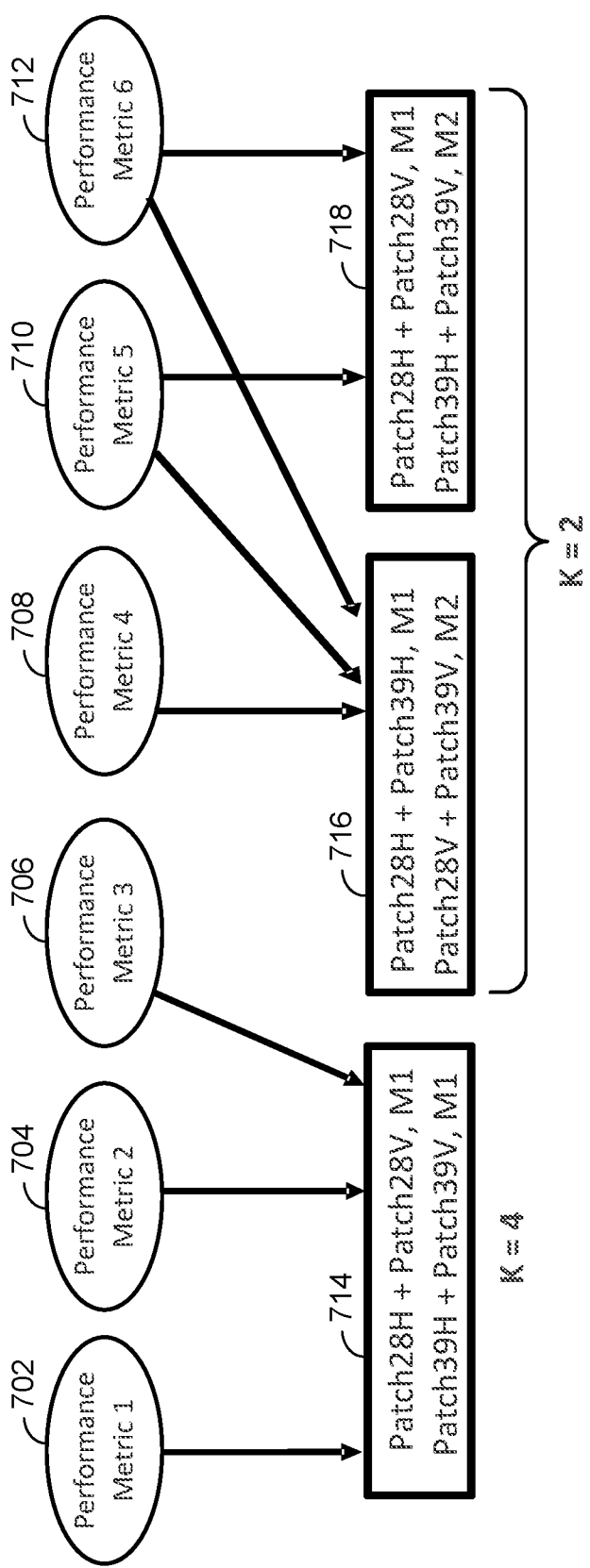
FIG. 7 is a second example of an antenna element set selection procedure based on one or more performance metrics.

FIG. 7 is a second example of a procedure for selecting one or more sets of antenna elements (e.g., selecting between antenna element sets 714, 716, or 718) based on one or more performance metrics (e.g., performance metrics 702, 704, 706, 708, 710, or 712). The performance metrics 702, 704, 706, 708, 710, or 712 may represent any performance or operational goals/targets for a UE. Performance metric 702 may represent a data rate metric, metric 704 may represent a power metric, metric 706 may represent a beam management metric, metric 708 may represent a robustness to polarization loss metric, metric 710 may represent a robustness to blockage metric, and 712 may represent a thermal metric, each as described above in connection with FIG. 6. In other implementations, the system may consider any number of performance metrics (e.g., more or fewer performance metrics than are shown in FIG. 7) and may choose between any number of sets of antenna elements (e.g., more or fewer antenna element sets than are shown in FIG. 7, such as including different combinations of elements or adding antenna elements for additional frequency bands). In the example of FIG. 7, certain performance metrics are associated with certain sets of antenna elements usable together for carrier aggregation communications, such as inter-band carrier aggregation.

The antenna element set selection process of FIG. 7 recognizes that some sets of antenna elements may be more favorable than other sets of antenna elements when considering a specific performance goal. In an implementation where a UE is limited to four RF chains across all modules of the UE, a UE may select a fifth type of set of antenna elements, a sixth type of set of antenna elements, or a seventh type of set of antenna elements. These fifth, sixth, and seventh types of sets are usable in addition to the first, second, third, and fourth types of sets from FIG. 6 that are still usable in a maximum four RF chain system. Each of these types of antenna element set may have unique properties that lead to various benefits or tradeoffs.

The fifth type of set of antenna elements may include two orthogonal polarizations of patches (HPol and VPol) across two bands/carriers (e.g., Patch28HPol, Patch28VPol, Patch39HPol, Patch39VPol all in the same module). This type of set selection may have a relatively high data rate, a relatively lower beam management overhead, and a reduced power consumption. However, this type of set selection may also result in a higher temperature and have a relatively lower robustness to beam blockage and polarization loss.

The sixth type of set of antenna elements may include two orthogonal polarizations of patches (HPol and VPol) across one band/carrier in one module and another band/carrier in a second module (e.g., Patch28HPol, Patch28VPol in Module 1, and Patch39HPol, Patch39VPol in Module 2). This type of set selection may result in a relatively lower temperature (lower than other set selection options), and have a relatively higher robustness to beam blockage. However, this type of set selection may also achieve relatively lower rates, have a relatively higher beam management overhead, have a relatively higher power consumption, and have a relatively lower robustness to polarization loss.

The seventh type of set of antenna elements may include two same polarization of patches (HPol) across two bands/carriers in one module and different polarization of patches (VPol) across two bands/carriers in a second module (e.g., Patch28HPol, Patch39HPol in Module 1, and Patch28VPol, Patch39VPol in Module 2). This type of set selection may result in a relatively high robustness to polarization loss and beam blockage, and result in a relatively lower temperature. However, this type of set selection may also achieve relatively lower rates, relatively higher beam management overhead, and relatively higher power consumption.

As described above, the selection of one of the possible types of antenna element sets may have certain benefits and tradeoffs. Thus, the UE may select a preferred set of antenna elements depending on which performance metrics are most important to the UE for a given time period. The relative priorities of the performance metrics may change over time depending on the operating conditions of the UE and the performance expectations. The UE may be programmed with a fixed association table that shows preferred or desirable combinations of antenna elements for specific performance metrics/goals. Thus, the UE may determine a current priority list of performance metrics in order from high importance to low importance. The UE may then use the relative priority between metrics to choose the set of antenna elements that will most favorably meet the higher priority performance metrics.

FIG. 7 shows various association mappings between performance metrics 702, 704, 706, 708, 710, and 712 and antenna element sets 714, 716, and 718. For example, if performance metric 710 is most important to the UE at a given time, then the UE may select either antenna element set 716 or antenna element set 718 (or both). In the case of multiple suggested antenna element sets for one specific performance metric, the UE may select multiple antenna element sets (in this example, both 716 and 718) for sending to a base station as preferred antenna element sets. Alternatively, the UE may break the tie (e.g., the multiple possible set options) by considering second, third, fourth, or any other number of other performance metrics until a preferred set is determined. For example, if performance metric 708 is the second most important performance metric to the UE at a given time (second to performance metric 610), then the UE may select antenna element set 716 over antenna element set 718 because that antenna element set matches both the first and the second most important performance metrics while antenna element set 718 only matches with one of the metrics.

As another example, at a later time period the operating conditions of the UE may have changed since the last antenna element set selection (e.g., based on UE sensor data or other UE processing data), and accordingly the most important performance metric may have changed for the UE. For example, for this time period, performance metric 704 may be the highest priority metric (e.g., above the previous metric that had the highest priority: metric 710). Based on this change in performance metric priority over time, the UE may select antenna element set 714 as a preferred antenna element set for this time period based on its association with performance metric 704. The UE may continually or periodically reorder the relative priorities of the performance metrics over time depending on the goals of the UE and the current operating conditions. Thus, the preferred antenna element sets may change over time along with the changing relative priorities between performance metrics.

Figure 8:
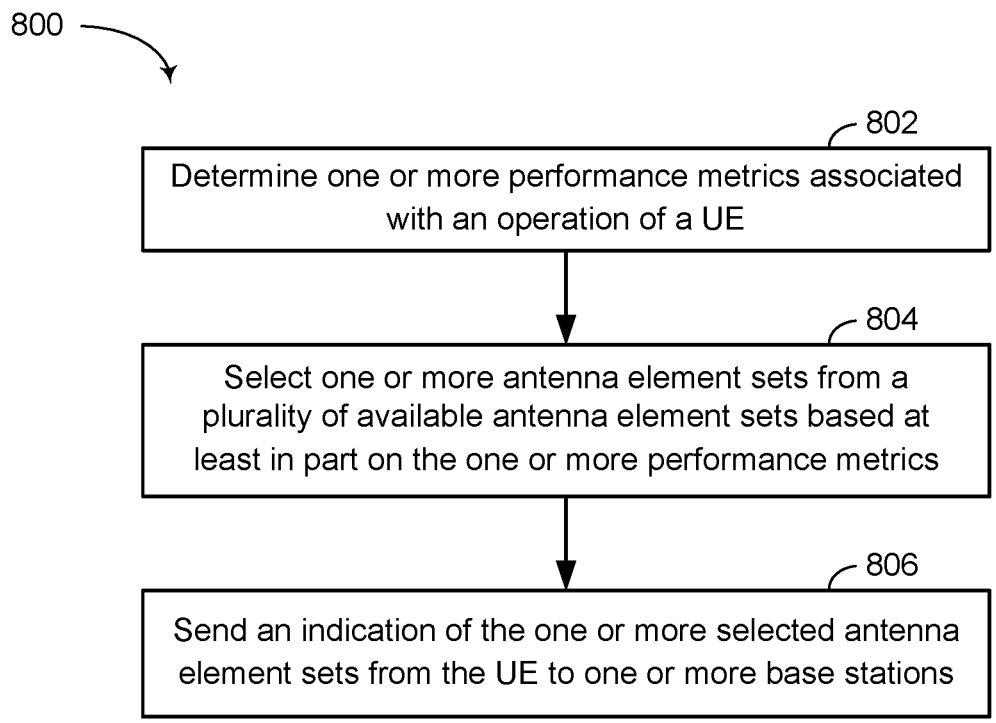
FIG. 8 is a flow diagram illustrating one example of a technique for a UE to send an indication of an antenna element set selection for an inter-band carrier aggregation communication.

FIG. 8 is a flow diagram illustrating one example of a process 800 for sending an indication of an antenna element set selection for an inter-band carrier aggregation communication. The process 800 may be performed by a wireless communication device, such as a UE (e.g., UE 115 of FIG. 1, UE 115-a of FIG. 2, device 305 of FIG. 3, or UE 500 of FIG. 5). In some implementations, the features in the steps shown in process 800 may performed by one or more components of device 305 as described in FIG. 3. For example, the processing steps of process 800 may be performed by the processor 340 coupled with memory 330 that includes instructions executable by the processor 340 to cause the device (e.g., UE) to perform the recited processing steps. As another example, the signal transmission and/or reception steps may be performed by a combination of one or more of the processor 340 (including instructions stored on memory 330), transceiver 320, RF chain components 315, and antenna elements 325. Additionally, or alternatively, a UE may perform aspects of the functions described in process 800 using special-purpose hardware.

At step 802, the UE determines one or more performance metrics associated with an operation of the UE. The performance metrics may include data regarding any one or more of: data transmission rate, power consumption, battery power level, spectral efficiency, beam management overhead, robustness to polarization loss, robustness to beam blockage, or thermal/temperature issues. Other implementations may consider additional types of performance metrics, fewer types of performance metrics, or different combinations or sub-combinations of performance metrics.

As a first example, the UE may determine a performance metric by comparing a measured data rate to a data rate threshold (e.g., to determine whether the current data rate is meeting the data rate goals for the communication). As a second example, the UE may determine a performance metric by comparing a measured spectral efficiency to a spectral efficiency threshold (e.g., to determine whether the current spectral efficiency is meeting the spectral efficiency goals for the communication). As a third example, the UE may determine a performance metric by comparing a measured power metric to a power threshold (e.g., to determine whether the current battery power level is below a target level or whether the power consumption levels are above a target level). As a fourth example, the UE may determine a performance metric by comparing a measured thermal metric to a thermal threshold (e.g., to determine whether a current operating temperature is above or below a target temperature level, such as a level that may indicate a temperature reduction is desired by throttling or turning off one or more components). As a fifth example, the UE may determine a performance metric by determining a priority level regarding robustness to polarization loss. As a sixth example, the UE may determine a performance metric by determining a priority level regarding robustness to blockage. As a seventh example, the UE may determine a performance metric by determining a priority level regarding an overhead associated with a beam management procedure. The UE may use any combination or sub-combination of these performance metrics, or may consider additional performance metrics instead of the listed examples or in addition to the listed examples.

In some implementations, when the UE determines the one or more performance metrics, the UE determines a priority level associated with one or more types of performance metrics. For example, as discussed in connection with FIGS. 6 and 7, the UE may consider the current operating conditions and/or current performance goals and determine which types of performance metrics are relatively more important to consider at that time when selecting the antenna element sets for an inter-band carrier aggregation communication. For example, the UE may determine that for a first period a first type of performance metric has a higher priority than a second type of performance metric. Thus, the UE will take this relative priority into consideration when selecting which set of antenna elements should be selected for the communication. Some sets of antenna elements will be better suited to meet the performance goals associated with the first type of performance metric than some other sets of antenna elements. If operating conditions or performance goals change over time, then the UE may determine for a second period that the relative priorities of the performance metrics have changed. For example, for the second period, the UE may determine that now the second type of performance metric has a higher priority than the first type of performance metric. Thus, the UE will take this change in relative priority (relative to the first period) into consideration when selecting which set of antenna elements should be selected for the communication.

At step 804, the UE selects one or more sets of antenna elements from a plurality of sets of antenna elements available for an inter-band carrier aggregation communication across at least two radio frequency (RF) chains between the UE and one or more base stations. The UE performs the selection at step 804 based at least in part on the one or more performance metrics determined at step 802. For example, the UE may consider performance metrics such as a priority level associated with specific metrics and information indicating which sets of antenna elements may be favorable for certain performance metrics (e.g., the highest priority metric at that time or multiple relatively high priority metrics at that time). Considering this performance metric information, the UE may select the one or more sets of antenna elements based at least in part on the priority of one type of performance metric over another type of performance metric.

A selected set of antenna elements may include a single antenna element, or may include multiple antenna elements. When the selected set includes multiple antenna elements, the antenna elements may be from a single antenna array, a single antenna module, multiple different antenna arrays, or multiple different antenna modules. The multiple antenna elements may be of a same type or different type (e.g., patch or dipole), and the same polarization or different polarizations (e.g., HPol or VPol). The multiple antenna elements may include antenna elements customized for operation in the same band, or customized for operation in different bands. For example, a selected set of antenna elements may include a first subset of antenna elements configured for operation in a first frequency band in a first RF chain and a second subset of antenna elements configured for operation in a second frequency band that is different than the first frequency band in a second RF chain that is different than the first RF chain. The first frequency band may be a component carrier or a bandwidth part (BWP) in a first millimeter wave band, and the second frequency band may be a component carrier or a BWP in a second millimeter wave band that is different than the first millimeter wave band. As another example, the selected set of antenna elements may include additional antenna elements configured for operation in additional bands (e.g., bringing the total number of bands supported by the set to more than two bands).

A selected set of antenna elements may support communication from the UE to a single base station or multiple base stations. For example, when communicating with multiple base stations in an inter-band carrier aggregation communication, the UE may use a first subset of antenna elements of the selected set to communicate within a first frequency band with a first base station while concurrently using a second subset of antenna elements of the selected set to communicate within a second frequency band with a second base station. The multiple base stations may be collocated (e.g., supported on a same tower or even within a same housing), or may be spaced at different geographical locations (e.g., on different towers). The multiple base stations may be coordinated and controlled via a network level high-speed interface (e.g., optical or fiber or backhaul links).

At step 806, the UE sends an indication of the one or more selected sets of antenna elements to one or more base stations. For an inter-band carrier aggregation communication, the UE may be supported by one or multiple base stations. The UE may send a message signaling the UE's preferred antenna element set(s) to one base station, one primary base station out of multiple base stations that will be involved in the communication, or each of the multiple base stations involved in the communication. The message includes an indication that identifies the selected antenna element set(s). The indication may include an identifier of specific antenna elements (e.g., using antenna element indexes), an identifier of a specific set of antenna elements (e.g., using set indexes), a identifier of a beam that corresponds to the selected antenna element set (e.g., using beam indexes), or any other way to inform the base station of the UE's selected antenna element set(s) either explicitly or implicitly.

The UE may send an indication at step 806 of a single selected set of antenna elements, or may send an indication of multiple selected sets of antenna elements. When an indication of a single selected set is sent, the UE may be signaling to the receiving base station that the UE plans to use only this one set for the planned communication. Alternatively, when the UE sends an indication of multiple selected sets of antenna elements, the UE may be signaling to the receiving base station that the UE is willing to use any one of the selected antenna element sets for the planned communication. The base station may then choose between the provided set options, such as based on one or more network level considerations (such as interference created by the one or more base stations, beam management overhead at the base station(s), base station priorities, etc.). If the base station has a preference between multiple options provided by the UE, the base station may then send an indication of the base station's preferred set of antenna elements back to the UE. The UE may then use the base station's input to determine a selection of an antenna element set for the planned communication.

Figure 9:
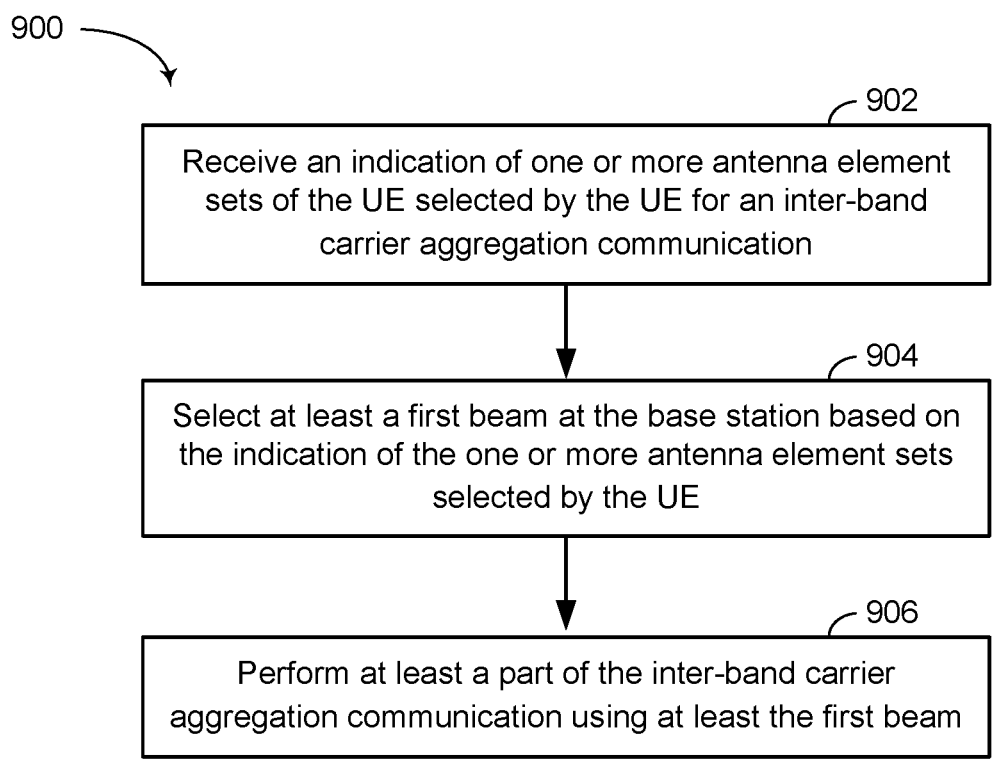
FIG. 9 is a flow diagram illustrating one example of a technique for a base station to receive an indication of an antenna element set selection for an inter-band carrier aggregation communication.

FIG. 9 is a flow diagram illustrating one example of a process 900 for receiving an indication of an antenna element set selection for an inter-band carrier aggregation communication. The process 900 may be performed by a communication device, such as a base station (e.g., base station 105 of FIG. 1, base station 105-*a* of FIG. 2, or device 405 of FIG. 4). In some implementations, the features in the steps shown in process 900 may performed by one or more components of device 405 as described in FIG. 4. For example, the processing steps of process 900 may be performed by the processor 440 coupled with memory 430 that includes instructions executable by the processor 440 to cause the device (e.g., base station) to perform the recited processing steps. As another example, the signal transmission and/or reception steps may be performed by a combination of one or more of the processor 440 (including instructions stored on memory 430), transceiver 420, RF chain components 415, and antenna elements 425. Additionally, or alternatively, a base station may perform aspects of the functions described in process 900 using special-purpose hardware.

At step 902, the base station receives an indication from a UE of one or more sets of antenna elements of the UE selected by the UE for an inter-band carrier aggregation communication between the UE and one or more base stations. The indication received in step 902 corresponds to the indication sent by the UE in step 806 (FIG. 8).

At step 904, the base station selects at least a first base station beam based on the indication of the one or more sets of antenna elements selected by the UE. In one example, the base station selects a communication beam for use in participating in the inter-band carrier aggregation communication with the UE. The base station beam selected at step 904 may be used for transmitting downlink data to the UE or receiving uplink data from the UE. The base station may select the base station beam based on forming a desirable beam link pair with a UE beam that corresponds to at least one of the one or more sets of antenna elements selected by the UE (and indicated to the base station at step 902). In another example, the base station beam selected at step 904 is selected as a candidate beam to be used for a beam training process of the inter-band carrier aggregation communication. The base station may select the candidate base station beam to correspond to one or more UE beams that are likely used for the planned inter-band carrier aggregation communication. Further details regarding the base station's use of the indication received in step 902 to focus the beam training procedure is discussed below in connection with FIGS. 11 and 12.

At step 906, the base station performs at least a part of the inter-band carrier aggregation communication between the UE and the base station using at least the first base station beam. In one example, the base station uses the selected base station beam to transmit data to the UE or receive data from the UE. In another example, the base station uses the selected base station beam to perform a beam training process as part of the inter-band carrier aggregation communication.

Figure 10:
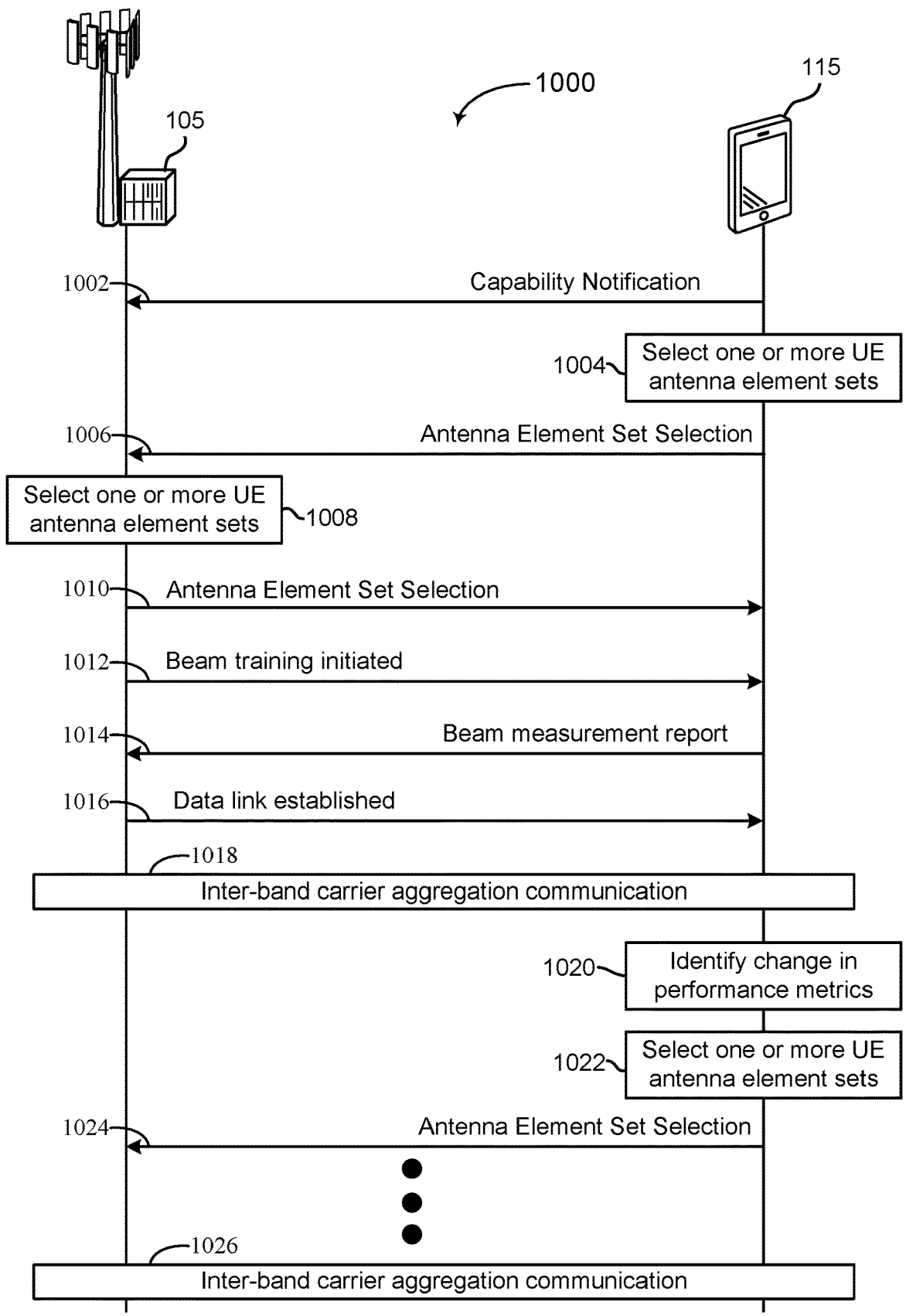
FIG. 10 is a message flow diagram illustrating an antenna element set selection process for an inter-band carrier aggregation communication.

FIG. 10 is a message flow diagram illustrating a process 1000 for antenna element set selection for an inter-band carrier aggregation communication. The process 1000 may be performed between a first wireless communication device and one or more second wireless communication device. The first wireless communication device may be a UE (e.g., UE 115 of FIG. 1, UE 115-*a* of FIG. 2, device 305 of FIG. 3, or UE 500 of FIG. 5), and the second wireless communication device(s) may be base stations (e.g., base station 105 of FIG. 1, base station 105-*a* of FIG. 2, or device 405 of FIG. 4). In some implementations, the features shown in process 1000 may performed by one or more components of device 305 as described in FIG. 3 (for UE actions) and one or more components of device 405 as described in FIG. 4 (for base station actions). For example, the UE processing steps of process 1000 may be performed by the processor 340 coupled with memory 330 that includes instructions executable by the processor 340 to cause the device (e.g., UE) to perform the recited processing steps. The base station processing steps of process 1000 may be performed by the processor 440 coupled with memory 430 that includes instructions executable by the processor 440 to cause the device (e.g., base station) to perform the recited processing steps. As another example, the UE signal transmission and/or reception steps may be performed by a combination of one or more of the processor 340 (including instructions stored on memory 330), transceiver 320, RF chain components 315, and antenna elements 325. The base station signal transmission and/or reception steps may be performed by a combination of one or more of the processor 440 (including instructions stored on memory 430), transceiver 420, RF chain components 415, and antenna elements 425. Additionally, or alternatively, a UE or base station may perform aspects of the functions described in process 1000 using special-purpose hardware.

The base station 105 shown in FIG. 10 may represent a single base station in some implementations, but may represent multiple base stations in other implementations where the UE sets up an inter-band carrier aggregation communication with multiple different base stations (either co-located or at different geographical locations). When communicating with multiple base stations, the UE may send the messages shown in FIG. 10 to multiple base stations, may receive messages shown in FIG. 10 from multiple base stations, or the multiple base stations may coordinate through a backhaul communication (or other communication path) such that the UE only negotiates communication setup with a primary one of the multiple base stations.

At step 1002, the UE sends a capability notification to the one or more base stations. The capability notification provides an indication from the UE to the one or more base stations regarding one or more inter-band carrier aggregation capabilities of the UE. For example, the one or more inter-band carrier aggregation capabilities of the UE may include one or more of an indication of a number of antenna modules at the UE, an indication of a limit on a number of allowable RF chains per antenna module, or a limit on a number of allowable RF chains at the UE across all antenna modules. The base station may use this capability information to assist the UE in the antenna element set selection process or to select a set of antenna elements for the UE (e.g., along with the base station considering other factors, such as network level considerations or UE performance metrics). Some implementations may operate without the capability notification of step 1002 and may rely on the UE to select the desired set(s) of antenna elements and the base station to coordinate a final set selection, beam training optimization, and/or communication setup accordingly.

At step 1004, the UE selects one or more antenna element sets, as discussed in more detail above at step 804 (FIG. 8). At step 1006, the UE notifies the base station of the antenna element set selection, as discussed in more detail above at step 806 (FIG. 8). At step 1008, the base station may select one or more UE antenna element sets. The set selection at step 1008 by the base station may start with the one or more set selections made by the UE and indicated at step 1006. For example, if the UE sent multiple possible sets that were considered acceptable to the UE, then the base station may choose one of the UE antenna element set options that is desirable to the base station. For example, the UE may select the initial sets based on UE factors or metrics, and the base station may narrow down the list and select one or more sets from the initial list based on network factors or metrics. At step 1010, the base station may send an indication to the UE that identifies the base station's selected set of UE antenna elements as being chosen for the inter-band carrier aggregation communication. The base station may use a similar set identification scheme or nomenclature, as discussed above in connection with the UE set selection identification of step 806 (FIG. 8).

At step 1012, the base station may trigger a beam training process. For example, the base station may send a set of beam training reference signals to the UE. The UE may receive the beam training reference signals on a set of UE beams associated with at least one of the one or more selected sets of antenna elements. At step 1014, the UE may send a beam training measurement report to the base station in response to the set of beam training reference signals. The beam training measurement report may be based on measurements the UE makes on the received reference signals. For example, the UE may determine one or more beamforming metrics based on the measurements made on the received reference signals.

At step 1016, the UE and the one or more base stations set up and establish the inter-band carrier aggregation communication by establishing a data link. At step 1018, the UE and the base station(s) participate in the inter-band carrier aggregation communication. The communication session is established and performed based on the antenna element set negotiated between the UE and the base station. For example, the UE may use the set selected only by the UE or based on an initial set list selected by the UE that is then narrowed down to one or more sets based on base station input. During the inter-band carrier aggregation communication, the UE may receive a downlink communication using the selected set of antenna elements, transmit an uplink communication using the selected set of antenna elements, or both.

At step 1020, the UE may identify a change in operating conditions, or performance goals, that results in a change in the monitored performance metrics. The UE may continuously monitor the performance metrics, periodically monitor the performance metrics, or monitor the performance metrics based on a trigger event (or randomly). The current or updated performance metrics may then be evaluated or prioritized, as discussed in connection with FIGS. 6 and 7 (and step 802 of FIG. 8). At step 1022, the UE uses the latest performance metrics (e.g., a relative priority between the metrics) to select one or more desired UE antenna element sets, as discussed in connection with FIGS. 6 and 7 (and step 804 of FIG. 8). For example, the UE may determine that for the current period a second type of performance metric has a higher priority than a first type of performance metric (while the first type of metric was higher priority for the first period). Based on this change in priority between the performance metrics, the UE may select one or more different sets of antenna elements for the second period (different than were used for the first period) and send an indication of the one or more different sets of antenna elements from the UE to the one or more base stations at step 1024 (as discussed in more detail above at step 806 (FIG. 8)). At step 1026, the UE and the base station participate in the inter-band carrier aggregation communication based on the newly selected antenna element set(s).

Figure 11:
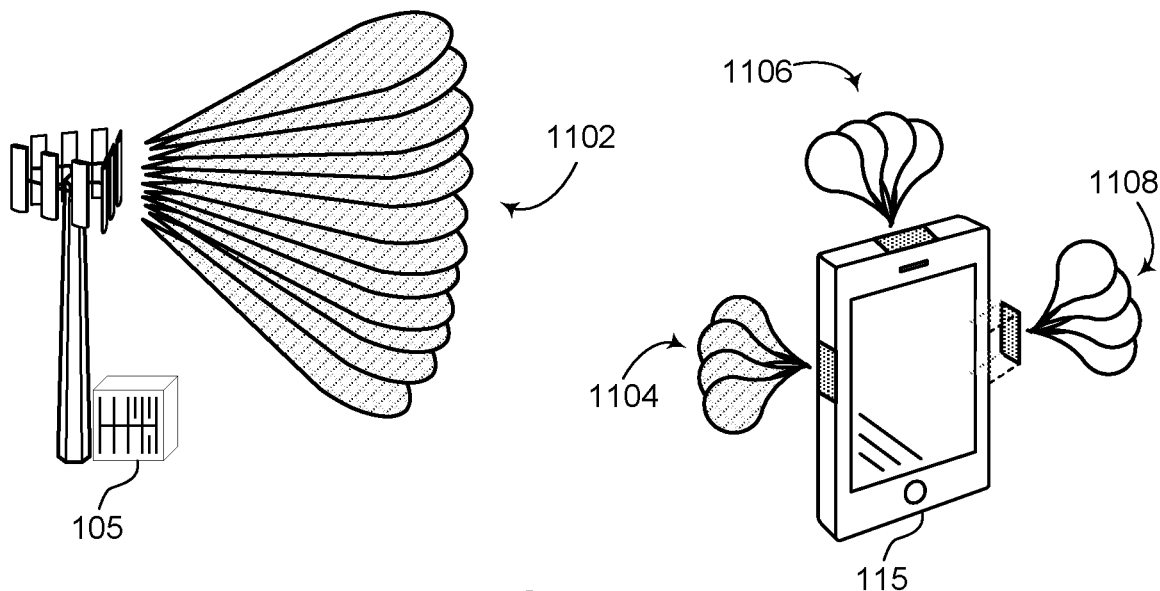
FIG. 11 is a first example of a beam training procedure between a UE and a base station.

FIG. 11 is a first example of a beam training procedure between a UE and a base station. After the UE has selected one or more sets of antenna elements for use in an inter-band carrier aggregation communication and informed the base station of the selected antenna element sets preferred to be used at the UE side, then the base station may use this information to focus its beam training procedure on the relevant UE-side beams. For example, the base station may determine that the UE has selected an antenna element set from a first antenna module of the UE and has not identified any antenna element sets involving antenna elements from the other antenna modules of the UE. In this situation, the base station may focus its beam training procedure on the UE beams that correspond to the antenna module that supports the selected antenna element set. In the example of FIG. 11, the base station may focus its base station beams 1102 to focus on the beams 1104 associated with the module that includes the selected set of antenna elements. By focusing on the beams 1104 associated with the module that includes the selected set of antenna elements, the base station may skip performing the beam training process on the other beams of the UE, such as the beams 1106 and 1108. For example, for this beam training procedure, the base station may transmit beam training reference signals to the beams 1104, but not send beam training reference signals to the beams 1106 and 1108. This focused beam training procedure may save time and power as compared to a full beam sweeping procedure that covers all beams.

In one specific example, the base station may determine, based on the indication of the one or more sets of antenna elements selected by the UE, that a first antenna array of a plurality of antenna arrays of the UE will be used by the UE for the inter-band carrier aggregation communication over a first RF chain. The base station may also determine, based on the indication of the one or more sets of antenna elements selected by the UE, that a second antenna array of the plurality of antenna arrays of the UE will be used by the UE for the inter-band carrier aggregation communication over a second RF chain. The base station may then focus its beam training procedure on one or more UE beams that correspond to the first antenna array and one or more beams that correspond to the second antenna array based on the determination that the first antenna array and the second antenna array will be used by the UE for the inter-band carrier aggregation communication. The base station may focus its beam training procedure by performing the beam training procedure without performing beam training on one or more UE beams that correspond to one or more other antenna arrays of the plurality of antenna arrays.

By focusing the beam training procedure on UE beams relevant to the selected UE antenna element sets, a base station can reduce the exhaustive beam training time that would be associated with checking across all beam pairs between the base station and UE across all subarrays. The base station may use the UE's set selection information to reduce the beam training time by focusing on a targeted set of beam pairs to be used for the specific set (at the UE side) selected for the planned communication.

Figure 12:
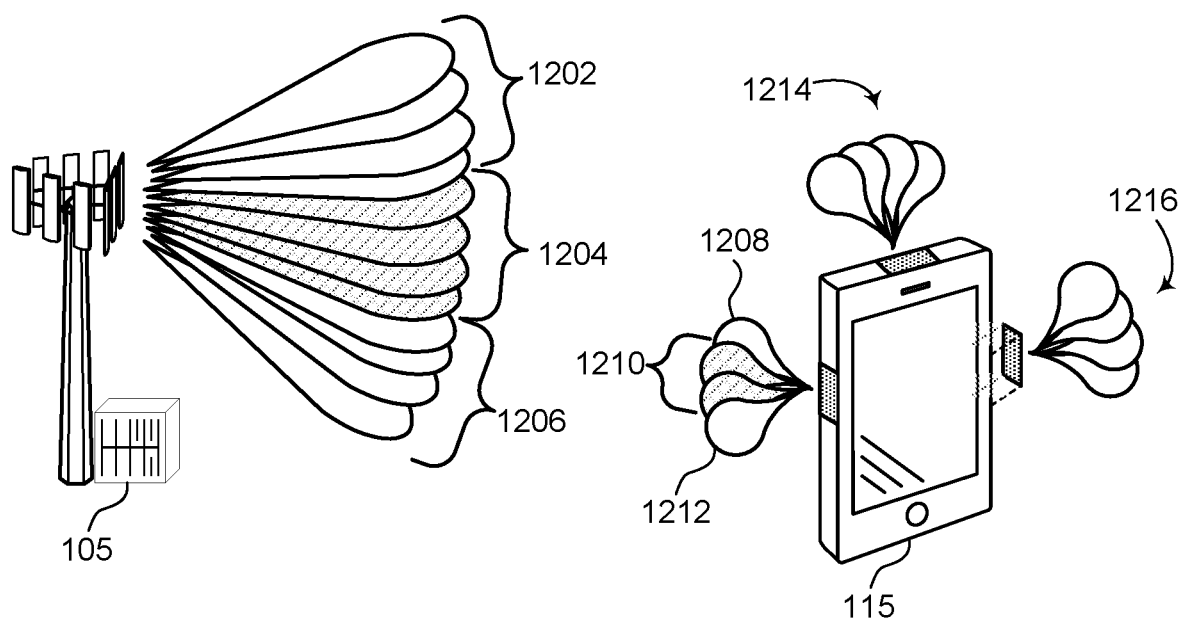
FIG. 12 is a second example of a beam training procedure between a UE and a base station.

FIG. 12 is a second example of a beam training procedure between a UE and a base station. After the UE has selected one or more sets of antenna elements for use in an inter-band carrier aggregation communication and informed the base station of the selected antenna element sets preferred to be used at the UE side, then the base station may use this information to focus its beam training procedure on the relevant UE-side beams and base station side beams. For example, the base station may determine that the UE has selected an antenna element set from a first antenna module of the UE and has not identified any antenna element sets involving antenna elements from the other antenna modules of the UE. In this situation, the base station may focus its beam training procedure on the base station beams and UE beams that correspond to the specific antenna element set(s) selected by the UE. In the example of FIG. 12, the base station may focus the beam training process on a sub-portion of its base station beams and a sub-portion of the UE beams. For example, the base station may focus on base station beams 1204 and UE beams 1210 as these are the beams that are associated with the selected set of antenna elements. By focusing on the base station beams 1204 and UE beams 1210 which are the base station and UE beams that are most likely associated with the selected set of antenna elements, the base station may skip performing the beam training process on the other beams of the base station and UE, such as the beams 1202, 1206, 1208, 1212, 1214, and 1216. For example, for this beam training procedure, the base station may transmit beam training reference signals from base station beams 1204 to the UE beams 1210, but not send beam training reference signals from other base station beams (1202 and 1206) or to other UE beams (1208, 1212, 1214, and 1216). This focused beam training procedure may save time and power as compared to a full beam sweeping procedure that covers all base station and UE beams. In one example, the base station may disable base station beams 1202 and 1206 when performing the beam training procedure for this specific communication which will be focused on beams that are relevant to the selected set of UE antenna elements.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable sub-combination. As such, although features may be described above as acting in particular combinations, and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on. Furthermore, although certain aspects may be described or claimed in the singular, the plural is contemplated unless limitation to the singular is explicitly stated.

What is claimed is:

1. A method of wireless communication, comprising:
determining one or more performance metrics associated with an operation of a user equipment (UE);
selecting, by the UE based at least in part on the one or more performance metrics, one or more sets of antenna elements from a plurality of sets of antenna elements available for an inter-band carrier aggregation communication across at least two radio frequency (RF) chains between the UE and one or more base stations;
sending an indication of the one or more selected sets of antenna elements from the UE to the one or more base stations;
performing at least a part of the inter-band carrier aggregation communication between the UE and the one or more base stations using a first set of antenna elements chosen from the one or more selected sets of antenna elements,
wherein performing at least the part of the inter-band carrier aggregation communication comprises receiving a downlink communication using the first set of antenna elements, transmitting an uplink communication using the first set of antenna elements, or both;
wherein the first set of antenna elements comprises a first subset of antenna elements configured for operation in a first frequency band in a first RF chain and a second subset of antenna elements configured for operation in a second frequency band that is different than the first frequency band in a second RF chain that is different than the first RF chain; and
using the first subset of antenna elements to communicate within the first frequency band with a first base station of the one or more base stations while concurrently using the second subset of antenna elements to communicate within the second frequency band with a second base station of the one or more base stations.

2. The method of claim 1, further comprising receiving an indication at the UE from at least one of the one or more base stations that identifies the first set of antenna elements as being chosen for the inter-band carrier aggregation communication.

3. The method of claim 1, wherein the first frequency band comprises a component carrier or a bandwidth part in a first millimeter wave band, and the second frequency band comprises a component carrier or a bandwidth part in a second millimeter wave band that is different than the first millimeter wave band.

4. The method of claim 1, further comprising sending a capability indication from the UE to the one or more base stations regarding one or more inter-band carrier aggregation capabilities of the UE.

5. The method of claim 4, wherein the one or more inter-band carrier aggregation capabilities of the UE comprise one or more of an indication of a number of antenna modules at the UE, an indication of a limit on a number of allowable RF chains per antenna module, or a limit on a number of allowable RF chains at the UE across all antenna modules.

6. The method of claim 1, further comprising:
receiving a set of beam training reference signals at the UE from at least one of the one or more base stations on a set of UE beams associated with at least one of the one or more selected sets of antenna elements; and
sending a beam training measurement report from the UE to the at least one of the one or more base stations in response to the set of beam training reference signals.

7. The method of claim 1, wherein determining the one or more performance metrics comprises determining for a first period that a first type of performance metric has a higher priority than a second type of performance metric; and
wherein selecting the one or more sets of antenna elements comprises selecting the one or more sets of antenna elements for the first period based at least in part on the priority of the first type of performance metric over the second type of performance metric.

8. The method of claim 7, further comprising:
determining that for a second period the second type of performance metric has a higher priority than the first type of performance metric;
selecting one or more different sets of antenna elements for the second period based at least in part on the priority of the second type of performance metric over the first type of performance metric; and
sending an indication of the one or more different sets of antenna elements from the UE to the one or more base stations.

9. The method of claim 1, wherein determining the one or more performance metrics comprises at least one of:
comparing a measured rate to a rate threshold;
comparing a measured spectral efficiency to a spectral efficiency threshold;
comparing a measured power metric to a power threshold; or
comparing a measured thermal metric to a thermal threshold.

10. The method of claim 1, wherein determining the one or more performance metrics comprises at least one of:
determining a priority level regarding robustness to polarization loss;
determining a priority level regarding robustness to blockage; or
determining a priority level regarding an overhead associated with a beam management procedure.

11. The method of claim 1, wherein the first subset of antenna elements includes only a single antenna element, and the second subset of antenna elements includes only a single antenna element.

12. The method of claim 1, wherein the first subset of antenna elements includes multiple antenna elements, and the second subset of antenna elements includes multiple antenna elements.

13. The method of claim 1, wherein sending the indication of the one or more selected sets of antenna elements comprises sending an indication of only a single set of antenna elements selected by the UE, wherein the first set of antenna elements chosen from the one or more selected sets of antenna elements is the single set of antenna elements selected by the UE.

14. The method of claim 1, wherein sending the indication of the one or more selected sets of antenna elements comprises sending an indication of multiple sets of antenna elements selected by the UE, wherein the first set of antenna elements is chosen from the multiple sets of antenna elements.

15. The method of claim 1, wherein sending the indication of the one or more selected sets of antenna elements to the one or more base stations comprises sending the indication to the first base station, the second base station, or both.

16. The method of claim 1, further comprising sending a capability indication from the UE to the one or more base stations that includes an indication of a limit on a number of allowable RF chains per antenna module of the UE.

17. A user equipment (UE) for wireless communication, comprising:
a processor; and
a memory coupled with the processor, wherein the memory includes instructions executable by the processor to cause the UE to:
determine one or more performance metrics associated with an operation of the UE;
select, based at least in part on the one or more performance metrics, one or more sets of antenna elements from a plurality of sets of antenna elements available for an inter-band carrier aggregation communication across at least two radio frequency (RF) chains between the UE and one or more base stations; and
send an indication of the one or more selected sets of antenna elements from the UE to the one or more base stations;
perform at least a part of the inter-band carrier aggregation communication between the UE and the one or more base stations using a first set of antenna elements chosen from the one or more selected sets of antenna elements, wherein the first set of antenna elements comprises a first subset of antenna elements configured for operation in a first frequency band in a first RF chain and a second subset of antenna elements configured for operation in a second frequency band that is different than the first frequency band in a second RF chain that is different than the first RF chain; and
use the first subset of antenna elements to communicate within the first frequency band with a first base station of the one or more base stations while concurrently using the second subset of antenna elements to communicate within the second frequency band with a second base station of the one or more base stations.

18. The UE of claim 17, wherein the memory includes instructions executable by the processor to cause the UE to send a capability indication from the UE to the one or more base stations regarding one or more inter-band carrier aggregation capabilities of the UE, wherein the one or more inter-band carrier aggregation capabilities of the UE comprise one or more of an indication of a number of antenna modules at the UE, an indication of a limit on a number of allowable RF chains per antenna module, or a limit on a number of allowable RF chains at the UE across all antenna modules.

19. The UE of claim 17, wherein the instructions executable by the processor to cause the UE to determine the one or more performance metrics comprise instructions executable by the processor to cause the UE to determine for a first period that a first type of performance metric has a higher priority than a second type of performance metric; and
wherein the instructions executable by the processor to cause the UE to select the one or more sets of antenna elements comprise instructions executable by the processor to cause the UE to select the one or more sets of antenna elements for the first period based at least in part on the priority of the first type of performance metric over the second type of performance metric.

20. The UE of claim 19, wherein the memory includes instructions executable by the processor to cause the UE to:
determine that for a second period the second type of performance metric has a higher priority than the first type of performance metric;
select one or more different sets of antenna elements for the second period based at least in part on the priority of the second type of performance metric over the first type of performance metric; and
send an indication of the one or more different sets of antenna elements from the UE to the one or more base stations.

21. The UE of claim 17, wherein the instructions executable by the processor to cause the UE to determine the one or more performance metrics comprise instructions executable by the processor to cause the UE to:
compare a measured rate to a rate threshold;
compare a measured spectral efficiency to a spectral efficiency threshold;
compare a measured power metric to a power threshold; or
compare a measured thermal metric to a thermal threshold.

22. The UE of claim 17, wherein the instructions executable by the processor to cause the UE to determine the one or more performance metrics comprise instructions executable by the processor to cause the UE to:

determine a priority level regarding robustness to polarization loss;
determine a priority level regarding robustness to blockage; or
determine a priority level regarding an overhead associated with a beam management procedure.

23. The UE of claim 17, wherein the first subset of antenna elements includes only a single antenna element, and the second subset of antenna elements includes only a single antenna element.

24. The UE of claim 17, wherein the first subset of antenna elements includes multiple antenna elements, and the second subset of antenna elements includes multiple antenna elements.

25. The UE of claim 17, wherein the instructions executable by the processor to cause the UE to send the indication of the one or more selected sets of antenna elements comprise instructions executable by the processor to cause the UE to send an indication of only a single set of antenna elements selected by the UE, wherein the first set of antenna elements chosen from the one or more selected sets of antenna elements is the single set of antenna elements selected by the UE.

26. The UE of claim 17, wherein the instructions executable by the processor to cause the UE to send the indication of the one or more selected sets of antenna elements comprise instructions executable by the processor to cause the UE to send an indication of multiple sets of antenna elements selected by the UE, wherein the first set of antenna elements is chosen from the multiple sets of antenna elements.

27. The UE of claim 17, wherein the instructions executable by the processor to cause the UE to send the indication of the one or more selected sets of antenna elements to the one or more base stations comprise instructions executable by the processor to cause the UE to send the indication to the first base station, the second base station, or both.

28. The UE of claim 17, wherein the memory includes instructions executable by the processor to cause the UE to send a capability indication from the UE to the one or more base stations that includes an indication of a limit on a number of allowable RF chains per antenna module of the UE.

* * * * *